United States Patent
Sudo

(10) Patent No.: US 7,206,597 B2
(45) Date of Patent: Apr. 17, 2007

(54) TRANSMISSION APPARATUS AND AUTO GAIN CONTROL METHOD

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 115 days.

(21) Appl. No.: 10/516,180

(22) PCT Filed: Nov. 5, 2003

(86) PCT No.: PCT/JP03/14095

§ 371 (c)(1),
(2), (4) Date: Nov. 30, 2004

(87) PCT Pub. No.: WO2004/042940

PCT Pub. Date: May 21, 2004

(65) Prior Publication Data

US 2005/0227645 A1 Oct. 13, 2005

(30) Foreign Application Priority Data

Nov. 8, 2002 (JP) .............................. 2002-325225

(51) Int. Cl.
*H04B 7/00* (2006.01)
*H04Q 7/20* (2006.01)

(52) U.S. Cl. ................... 455/522; 455/69; 370/324; 370/349; 370/350; 370/392; 370/470; 370/509; 375/354; 375/365; 375/366; 369/47.27

(58) Field of Classification Search ............... 455/522, 455/69; 370/324, 349–350, 509, 392, 470–472; 375/224, 296–297, 354, 365–366; 369/47.27

See application file for complete search history.

(56) References Cited

U.S. PATENT DOCUMENTS 5,504,775 A 4/1996 Chouly et al.

(Continued)

FOREIGN PATENT DOCUMENTS

JP 09284212 10/1997

(Continued)

OTHER PUBLICATIONS

International Search Report dated Feb. 10, 2004.

(Continued)

*Primary Examiner*—Edan Orgad
*Assistant Examiner*—RuiMeng Hu
(74) *Attorney, Agent, or Firm*—Stevens, Davis, Miller & Mosher, LLP

(57) ABSTRACT

A transmission control section 101 temporarily stores a transmission signal, outputs the stored transmission signal to a coding section 102 and outputs transmission timing information to a counter section 107. A preamble insertion section 104 inserts AGC preambles corresponding to the number set by a preamble number control section 110 into the transmission signal. The preamble number control section 110 compares a transmission time interval input from a subtraction section 109 with a threshold, decides to insert ten AGC preambles into the transmission signal when the transmission time interval is equal to or greater than the threshold and decides to insert five AGC preambles into the transmission signal when the transmission time interval is smaller than the threshold. By so doing, it is possible to make the transmission efficiency compatible with the error rate characteristic.

23 Claims, 12 Drawing Sheets

U.S. PATENT DOCUMENTS

| | | | |
|---|---|---|---|
| 6,563,880 B1 * | 5/2003 | Hunsinger et al. | 375/260 |
| 6,876,675 B1 * | 4/2005 | Jones et al. | 370/509 |
| 6,898,755 B1 * | 5/2005 | Hou | 714/784 |
| 2001/0001760 A1 * | 5/2001 | Taira et al. | 455/422 |
| 2002/0164968 A1 * | 11/2002 | Crawford | 455/277.1 |
| 2003/0103476 A1 * | 6/2003 | Choi et al. | 370/329 |
| 2003/0146870 A1 * | 8/2003 | Guo et al. | 342/383 |

FOREIGN PATENT DOCUMENTS

| | | |
|---|---|---|
| JP | 1056343 | 2/1998 |
| JP | 200069973 | 3/2000 |
| JP | 2001333038 | 11/2001 |

OTHER PUBLICATIONS

"Broadband Radio Access Networks (BRAN); HIPERLAN Type 2; Data Link Control (DLC) Layer, Part 1: Basic Data Transport Functions," ETSI TS 101 761-1 v1.2.1A(Apr. 2000), Technical Specification, DTS/BRAN-0020004-1, www.elsi.org/lb/status/, European Telecommunications Standards Institute, 14 pages total, 2000.

* cited by examiner

TRANSMISSION APPARATUS AND AUTO GAIN CONTROL METHOD

TECHNICAL FIELD

The present invention relates to a transmission apparatus and auto gain control method, and more particularly, to a transmission apparatus and auto gain control method for transmitting a transmission signal including auto gain control preambles.

BACKGROUND ART

In a wireless communication system such as wireless LAN, a user is not always transmitting/receiving signals at a location with a constant reception level and the level of a signal received varies from one user to another, for example, the distance from a transmission antenna may be long or may be short. Therefore, suppressing the level of a received signal to within a dynamic range of an analog/digital converter is a technology essential to a wireless communication system. A demodulator performs this operation through an auto gain control (hereinafter referred to as "AGC") circuit. In order to adjust the amplitude of a received signal to within a dynamic range, the AGC circuit sends an AGC preamble signal before a signal such as a start symbol at the start of a packet and the AGC circuit controls an amplification gain based on the reception level of this preamble signal. The AGC preamble signal is designed to be sent by being inserted in a transmission signal together with data. An AGC error is an error between a target value of the reception level after AGC and actual reception level.

However, in a conventional transmission apparatus and gain control method, when appropriate AGC preambles cannot be set when, for example, the channel quality is poor, an AGC pull-in characteristic deteriorates, the signal may be clipped or the reception level may decrease, and quantization errors may increase, making it difficult to demodulate the received signal without errors. Furthermore, since AGC preambles are not data that is sent to the party on the other end, there is a problem that inserting AGC preambles deteriorates data transmission efficiency.

DISCLOSURE OF INVENTION

It is an object of the present invention to provide a transmission apparatus and auto gain control method which can make transmission efficiency compatible with an error rate characteristic.

This object can be attained by comparing a transmission time interval at which a transmission signal is sent to the party on the other end with a threshold, increasing the number of AGC preambles when the transmission time interval is equal to or greater than the threshold and setting the number of AGC preambles to a normal number when the transmission time interval is smaller than the threshold to adaptively change the number of AGC preambles according to the transmission time interval.

BEST MODE FOR CARRYING OUT THE INVENTION

With reference now to the attached drawings, embodiments of the present invention will be explained in detail below.

(Embodiment 1)

Figure 1:
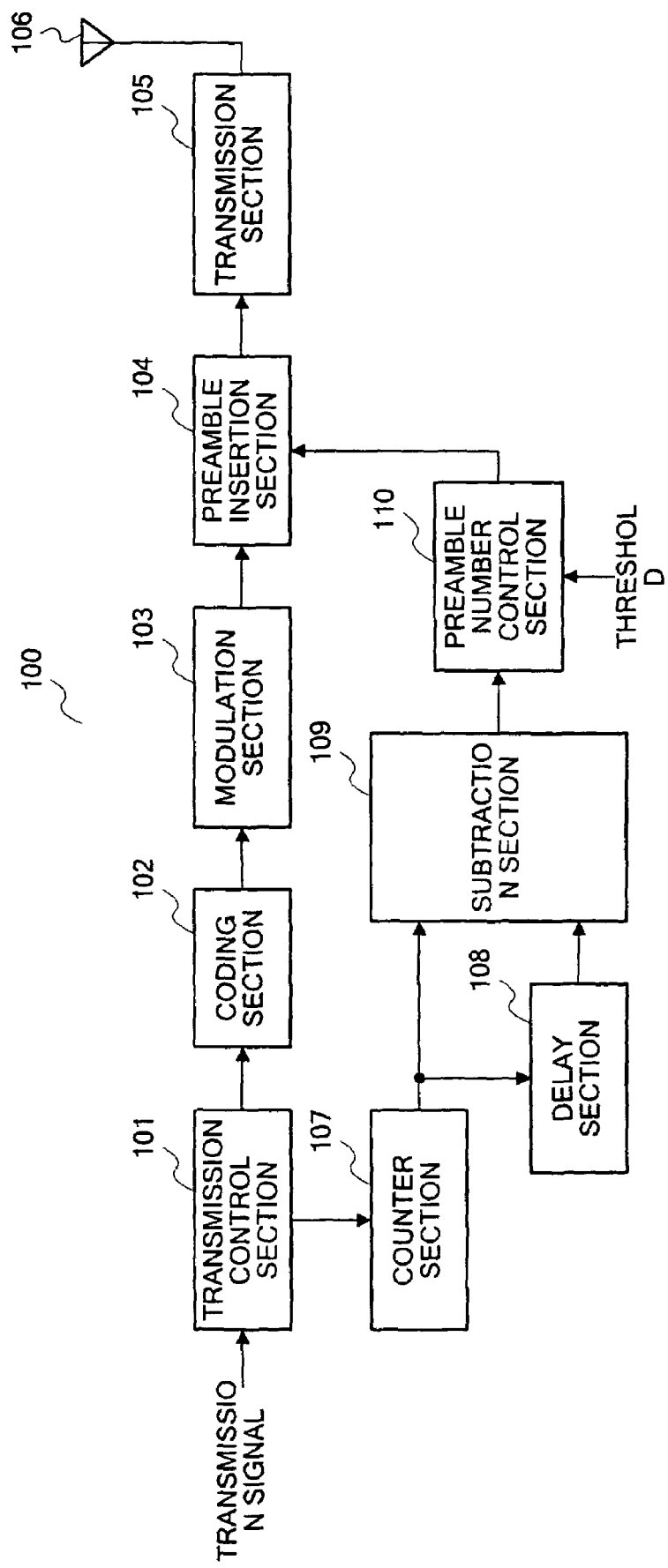
FIG. 1 is a block diagram showing a configuration of a transmission apparatus according to Embodiment 1 of the present invention.
Figure 2:
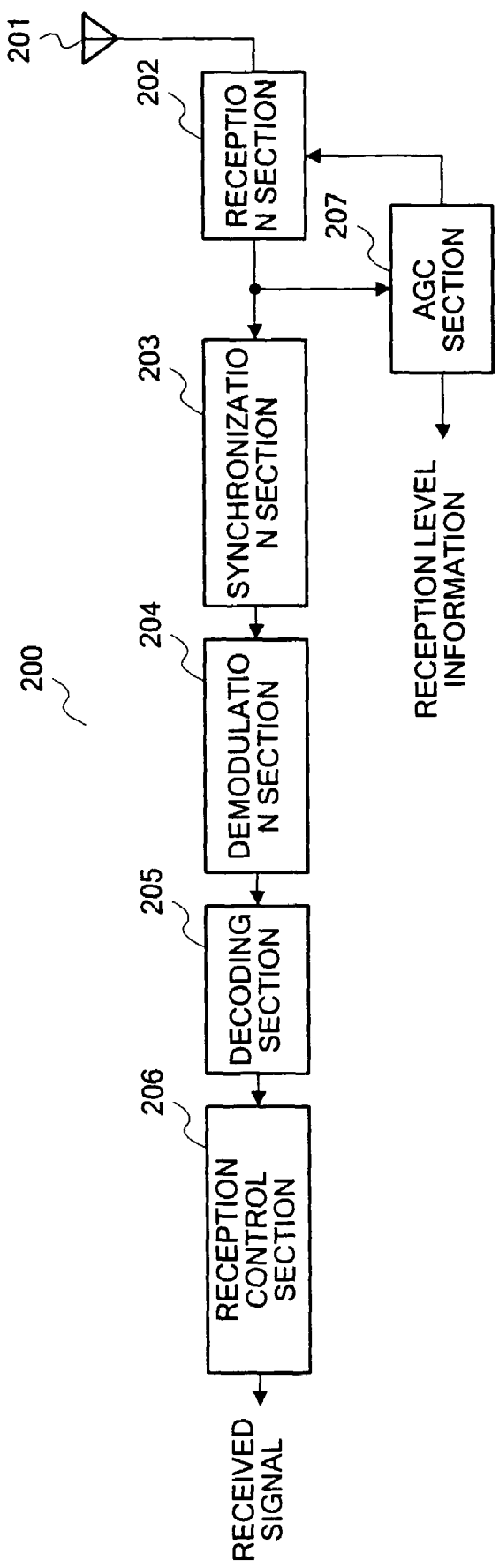
FIG. 2 is a block diagram showing a configuration of a reception apparatus according to Embodiment 1 of the present invention.

FIG. 1 illustrates a configuration of a transmission apparatus 100 according to Embodiment 1 of the present invention and FIG. 2 illustrates a configuration of a reception apparatus 200 according to Embodiment 1 of the present invention.

The transmission apparatus 100 is mainly constructed of a transmission control section 101, a coding section 102, a modulation section 103, a preamble insertion section 104, a transmission section 105, an antenna 106, a counter section 107, a delay section 108, a subtraction section 109 and a preamble number control section 110.

The reception apparatus 200 is mainly constructed of an antenna 201, a reception section 202, a synchronization section 203, a demodulation section 204, a decoding section 205, a reception control section 206 and an AGC section 207.

First, the configuration of the transmission apparatus 100 will be explained using FIG. 1.

The transmission control section 101 temporarily stores a transmission signal and outputs the transmission signal to the coding section 102 at a transmission timing. Furthermore, the transmission control section 101 decides the transmission timing, generates a transmission timing signal and outputs the generated transmission timing signal to the counter section 107. Here, transmission is carried out once per frame.

The coding section 102 carries out coding processing on the transmission signal input from the transmission control section 101 and outputs the coded transmission signal to the modulation section 103.

The modulation section 103 modulates the transmission signal input from the coding section 102 and outputs the modulated signal to the preamble insertion section 104. When an OFDM scheme is applied as the communication scheme, the modulation section 103 performs signal mapping such as QPSK or 16QAM on the transmission signal, then applies an inverse fast Fourier transform (IFFT) processing and performs orthogonal frequency division multiplexing on the transmission signal. On the other hand, when a CDMA scheme is applied as the communication scheme, the modulation section 103 carries out signal mapping such as QPSK or 16QAM on the transmission signal and then applies spreading processing.

The preamble insertion section 104 inserts various preambles such as AGC preamble number and propagation path estimation preamble into the transmission signal input from the modulation section 103 and outputs the transmission signal to the transmission section 105. The preamble insertion section 104 includes AGC preambles corresponding to the number determined by the preamble number control section 110 in the transmission signal and outputs the transmission signal to the transmission section 105.

The transmission section 105 converts the frequency of the transmission signal input from the preamble insertion section 104 from a baseband frequency to a radio frequency and transmits the transmission signal from the antenna 106.

The counter section 107 generates information indicating a transmission timing based on the transmission timing input from the transmission control section 101 which is a transmission interval measuring section and outputs the information to the delay section 108 and subtraction section 109.

The delay section 108 delays the information indicating the transmission timing input from the counter section 107 and outputs the delayed information to the subtraction section 109.

The subtraction section 109 calculates a difference between the previously transmitted transmission timing and a transmission timing to be transmitted this time (hereinafter described as "transmission timing difference") from the information indicating the transmission timing input from the counter section 107 and the information indicating the transmission timing input from the delay section 108 and outputs the calculated transmission timing difference as a transmission time interval to the preamble number control section 110.

The preamble number control section 110 compares a threshold with the transmission timing difference input from the subtraction section 109, adaptively determines the number of AGC preambles according to the result of the comparison with the threshold and instructs the preamble insertion section 104 to include the determined number of AGC preambles in the transmission signal.

The transmission time interval may become equal to or higher than the threshold in a case where the transmission time interval is long during transmission, a case where transmission is carried out first or a case where transmission in progress is interrupted once and then transmission is resumed. Therefore, it is possible to set a greater number of AGC preambles when transmission is carried out first than the number of AGC preambles for the second and subsequent transmissions. Furthermore, it is also possible to set the greater number of AGC preambles when transmission is resumed after a long period of interruption than the number of AGC preambles for the second and subsequent transmissions after transmission is resumed.

When the transmission time interval is equal to or greater than the threshold, the preamble number control section 110 can continue to increase the number of AGC preambles for a predetermined time after the transmission is performed with the number of AGC preambles increased. The method of setting the number of AGC preambles will be described later.

Next, the configuration of the reception apparatus 200 will be explained using FIG. 2.

The reception section 202 converts the frequency of the signal received from the antenna 201 from a radio frequency to a baseband frequency and outputs the signal to the synchronization section 203 and AGC section 207.

The synchronization section 203 detects the reception timing from the received signal input from the reception section 202 and outputs the detected reception timing to the demodulation section 204.

The demodulation section 204 demodulates the received signal input from the synchronization section 203 and outputs the demodulated signal to the decoding section 205.

The decoding section 205 carries out decoding processing on the received signal input from the demodulation section 204 and outputs the decoded signal to the reception control section 206.

The reception control section 206 temporarily stores the received signal input from the decoding section 205, detects whether there is an error or not and outputs the received signal when there is no error.

The AGC section 207 generates an AGC control signal from the received signal input from the reception section 202 and outputs the generated AGC control signal to the reception section 202. That is, the AGC section 207 performs control such that the reception level is kept constant even when the communication distance varies between radio communication apparatuses such as a base station apparatus and a communication terminal apparatus. Furthermore, the AGC section 207 calculates the reception level and outputs the calculated reception level as reception level information. The reception level information is, for example, an RSSI (Received Signal Strength Indicator). Note that the reception level information is not limited to the RSSI but can also be any information other than RSSI.

Figure 3:
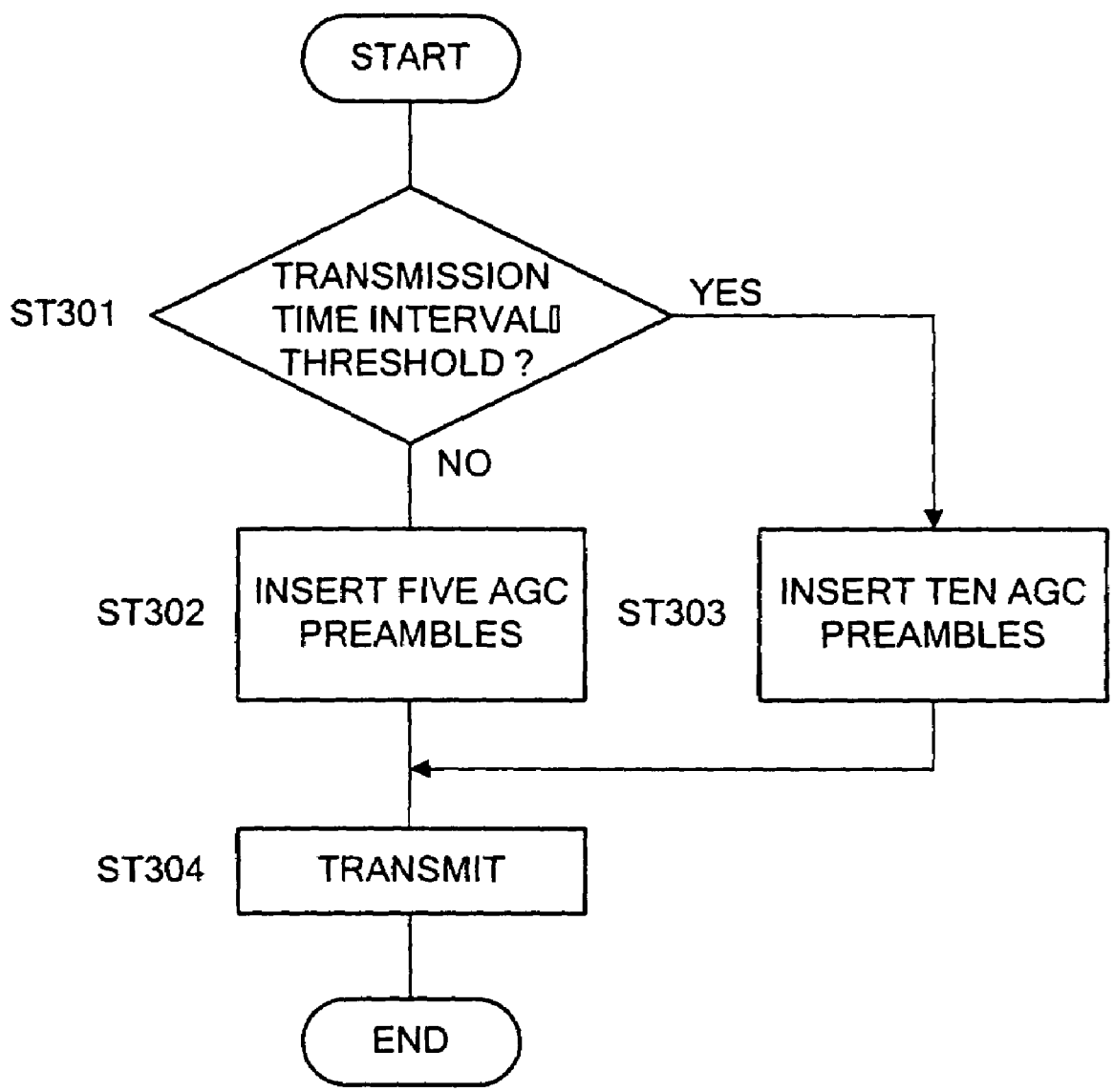
FIG. 3 is a flow chart showing an operation of a transmission apparatus according to Embodiment 1 of the present invention.
Figure 4:
FIG. 4 illustrates a frame format with five AGC preambles.
Figure 5:
FIG. 5 illustrates a frame format with ten AGC preambles.

Next, the operation of the transmission apparatus 100 will be explained using FIG. 3, FIG. 4 and FIG. 5. In FIG. 4 and FIG. 5, P1 to P10 denote AGC preambles and D1 to D3 denote transmission data. First, the transmission apparatus 100 counts a transmission timing using the counter section 107, calculates a transmission timing difference using the subtraction section 109, compares the transmission time interval with a threshold using the preamble number control section 110 (step (hereinafter referred to as "ST") ST301). When the transmission time interval is smaller than the threshold, it is decided that five AGC preambles are inserted and the preamble insertion section 104 inserts five AGC preambles as shown in FIG. 4 (ST302). On the other hand, when it is decided in ST301 that the transmission time interval is equal to or greater than the threshold, it is decided that ten AGC preambles are inserted, and the preamble insertion section 104 inserts ten AGC preambles as shown in FIG. 5 (ST303) Next, the transmission section 105 converts the frequency of the transmission signal from a baseband frequency to a radio frequency and transmits the converted signal from the antenna 106 (ST304).

Thus, according to the transmission apparatus and auto gain control method of this embodiment, the number of AGC preambles is adaptively changed according to the transmission timing difference, and therefore when the transmission time interval is long, the number of AGC preambles is increased to improve the error rate characteristic, and when the transmission time interval is short, the number of AGC preambles is reduced to give priority to the transmission efficiency, and therefore it is possible to prevent degradation of a pull-in characteristic due to auto gain control and make the transmission efficiency compatible with the error rate characteristic.

(Embodiment 2)

Figure 6:
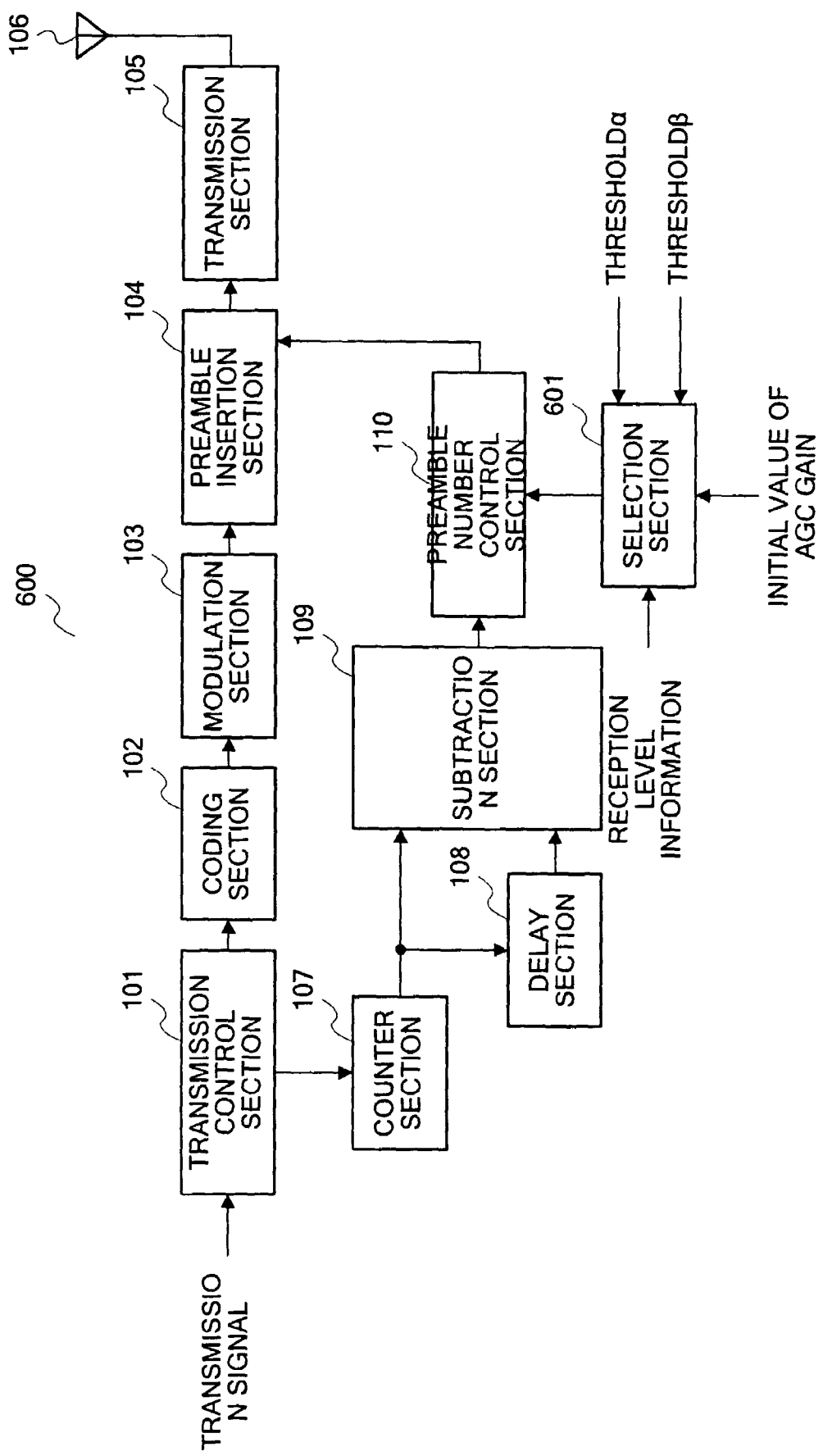
FIG. 6 is a block diagram showing a configuration of a transmission apparatus according to Embodiment 2 of the present invention.

FIG. 6 illustrates the configuration of a transmission apparatus 600 according to Embodiment 2 of the present invention. This embodiment is characterized in that the number of AGC preambles is changed according to the reception level. FIG. 6 differs from FIG. 1 in that a selection section 601 is provided. The same components as those in FIG. 1 are assigned the same reference numerals and explanations thereof will be omitted. Furthermore, the reception apparatus in this embodiment has the same configuration as that in FIG. 2, and therefore explanations thereof will be omitted.

Based on reception level information input from an AGC section 207 which is a reception level measuring section and an initial value of the AGC gain, the selection section 601 calculates the difference between the reception level information and the initial value of the AGC gain, compares the calculated difference with a threshold (not shown) and determines the number of AGC preambles according to the comparison result. That is, when the difference between the reception level information and the initial value of the AGC gain is smaller than the threshold, the time required to converge AGC is shorter, and therefore the selection section 601 selects threshold α (threshold α>threshold β) so as to reduce the number of AGC preambles and when the difference between the reception level information and the initial value of the AGC gain is equal to or greater than the threshold, the time required to converge AGC is longer, and therefore the selection section 601 selects threshold β so as to increase the number of AGC preambles. Note that the operation of the transmission apparatus 600 is the same as that in FIG. 3 except that a threshold used by the preamble number control section 110 is selected based on the reception level information and AGC initial value, and therefore explanations thereof will be omitted.

Thus, according to the transmission apparatus and auto gain control method of this embodiment, in addition to the effects of Embodiment 1, the time required for AGC pulling-in is estimated according to not only the transmission time interval but also the difference between the reception level information and the initial value of the AGC gain to set the number of AGC preambles, and therefore it is possible to set the number of AGC preambles in a more meticulous manner according to the channel situation with the party on the other end and further make the transmission efficiency compatible with the error rate characteristic.

(Embodiment 3)

Figure 7:
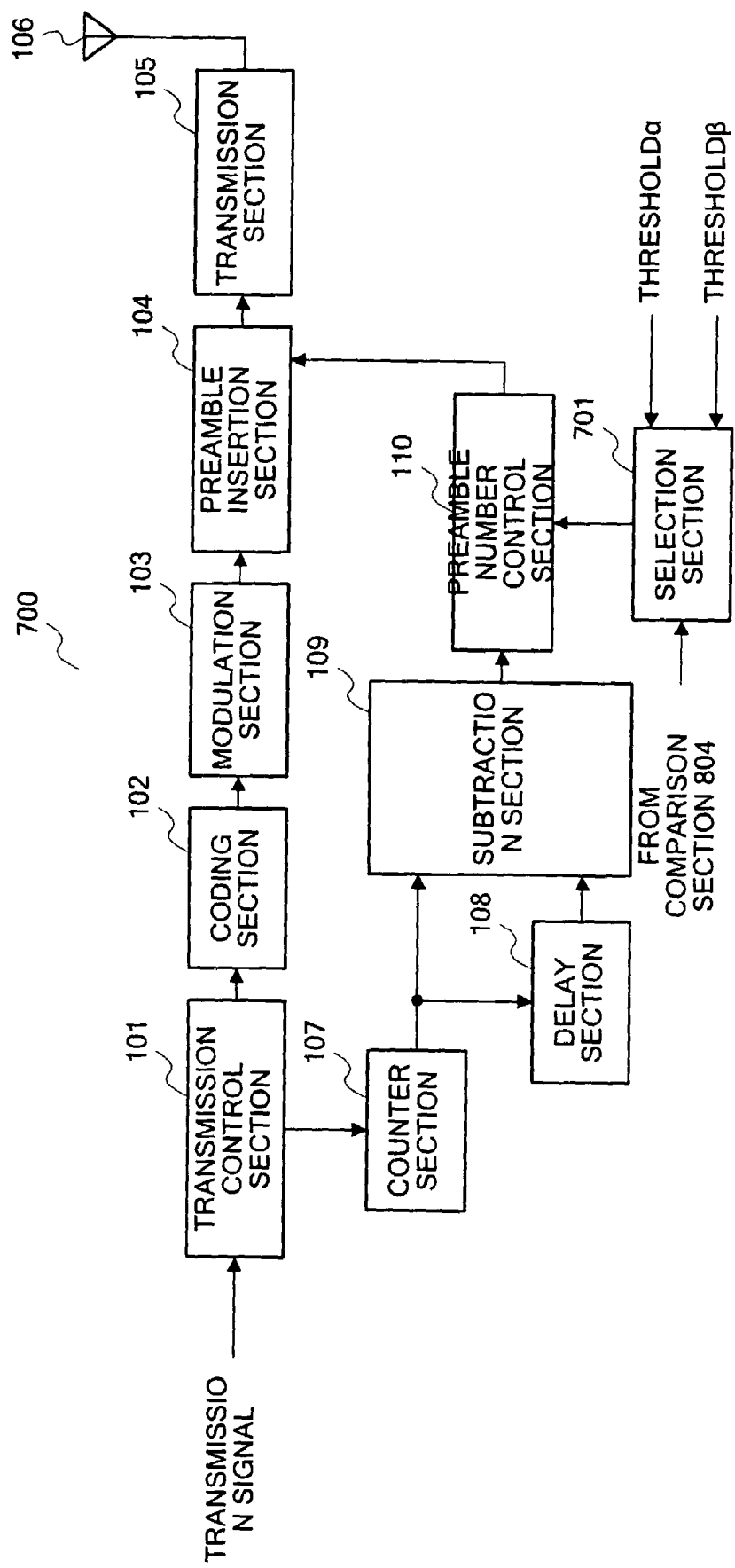
FIG. 7 is a block diagram showing a configuration of a transmission apparatus according to Embodiment 3 of the present invention.
Figure 8:
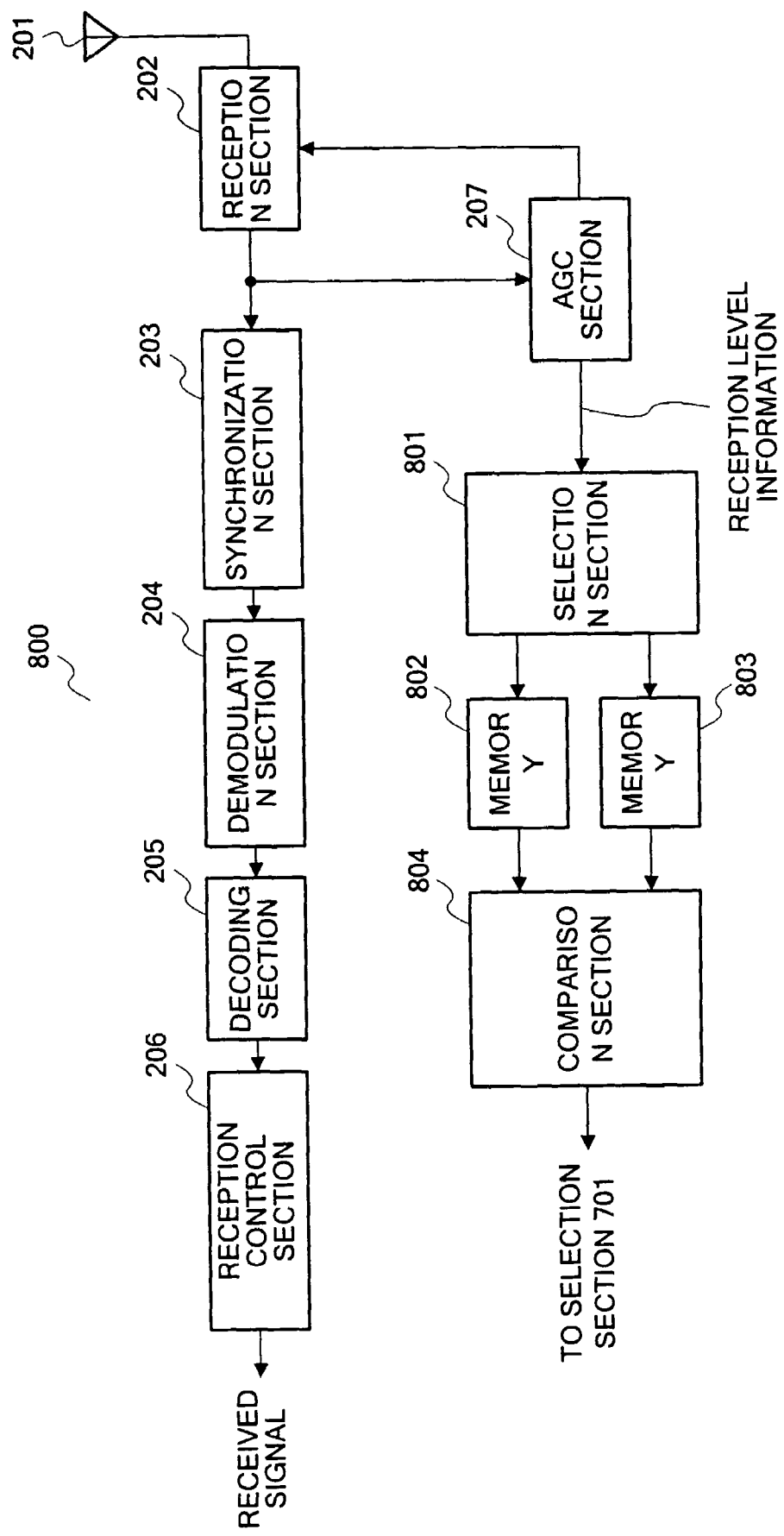
FIG. 8 is a block diagram showing a configuration of a reception apparatus according to Embodiment 3 of the present invention.

FIG. 7 illustrates a configuration of a transmission apparatus 700 according to Embodiment 3 of the present invention and FIG. 8 illustrates a configuration of a reception apparatus 800 according to Embodiment 3 of the present invention. This embodiment is characterized in that the number of AGC preambles is changed also in consideration of whether the distance from the party on the other end is increasing or reducing from that at time of the previous transmission using a history of reception level information. In this embodiment, FIG. 7 differs from FIG. 1 in that a selection section 701 is provided and the configuration including a selection section 801, a memory 802, a memory 803 and a comparison section 804 in FIG. 8 differs from that in FIG. 2. The same components as those in FIG. 1 and FIG. 2 are assigned the same reference numerals and explanations thereof will be omitted.

The selection section 701 selects either threshold α or threshold β (threshold α>threshold β) according to information input from the comparison section 804 as to whether the party on the other end is moving away or moving closer and outputs the selected threshold information to the preamble number control section 110. The AGC gain is generally increased when the distance from the party on the other end increases from that at the time of the previous communication. On the other hand, when the distance from the party on the other end decreases from that at the time of the previous communication, the AGC gain is reduced. The change rate is higher when the AGC is increased than when the AGC is decreased. For this reason, the selection section 701 sets threshold α when the distance from the party on the other end increases from that at the time of the previous communication and sets threshold β when the distance from the party on the other end decreases from that at the time of the previous communication. When an RSSI is used as reception level information, it is also possible to select threshold α or threshold β according to the change rate of the RSSI.

The selection section 801 outputs reception level information input from the AGC section 207 to the memory 802 and memory 803 alternately.

The memory 802 stores the reception level information input from the selection section 801 and outputs the reception level information to the comparison section 804. The timing at which the information is output to the comparison section 804 is the time at which the reception level information is stored in both the memory 802 and memory 803.

The memory 803 stores the reception level information input from the selection section 801 and outputs the reception level information to the comparison section 804. The timing at which the information is output to the comparison section 804 is the time at which the reception level information is stored in both the memory 802 and memory 803.

The comparison section 804 compares the respective pieces of the reception level information input from the memory 802 and memory 803, detects whether the change of the reception level information is increasing or decreasing and outputs the detection result to the selection section 701. The operation of the transmission apparatus 700 is the same as that in FIG. 3 except that the threshold used in the preamble number control section 110 is made variable, and therefore explanations thereof will be omitted.

As another method of selecting a threshold using reception level information at the selection section 701, it is also possible to select a threshold through extrapolation using past reception level information. In this case, when the channel condition changes drastically because the party on the other end is moving at a high speed, it is possible to set an appropriate number of AGC preambles on a case-by-case basis.

In this way, according to the transmission apparatus and auto gain control method of this embodiment, in addition to the effects of Embodiment 1, the number of AGC preambles is changed in consideration of not only the transmission time interval but also whether the terminal is moving away or moving closer, and therefore it is possible to set the number of AGC preambles in a more meticulous manner according to the channel situation, etc., with the party on the other end and further make the transmission efficiency compatible with the error rate characteristic. Furthermore, the number of AGC preambles is determined according to the history of the reception levels, and therefore when the number takes an outstandingly different value temporarily due to temporary degradation of the communication environment and it is not necessary to increase the number of AGC preambles urgently, it is possible to prevent the transmission efficiency from being reduced by increasing the number of AGC preambles.

In this embodiment, the selection section 701 selects a threshold from two thresholds α and β, but the number of thresholds that can be selected by the selection section 701 is not limited to the two thresholds α and β and the threshold can be selected from among an arbitrary number of thresholds. Furthermore, this embodiment stores reception levels corresponding to past two times in the memories 802, 803 and decides whether the party on the other end is moving away or moving closer, but the present invention is not limited to the case where reception levels corresponding to past two times are stored in the memories 802, 803 and it is decided whether the party on the other end is moving away or moving closer, and the present invention can also be adapted so that reception levels of past three or more times are stored in memory and it is decided whether the party on the other end is moving away or moving closer. In this case, the number of memories can be three or more. Furthermore, the comparison section 804 can decide whether the party on the other end is moving at a high speed or low speed, and therefore when the party on the other end is moving at a high speed, it is possible to increase the number of AGC preambles and fix the number to that value. Furthermore, this embodiment selects threshold α or threshold β by subtracting the reception level information and deciding whether the party on the other end is moving away or moving closer, but the present invention is not limited to the case where threshold α or threshold α is selected by subtracting the reception level information and deciding whether the party on the other end is moving away or moving closer and the present invention can also be adapted so that reception level information is averaged and the averaged reception level information is used to select threshold α or threshold β.

(Embodiment 4)

Figure 9:
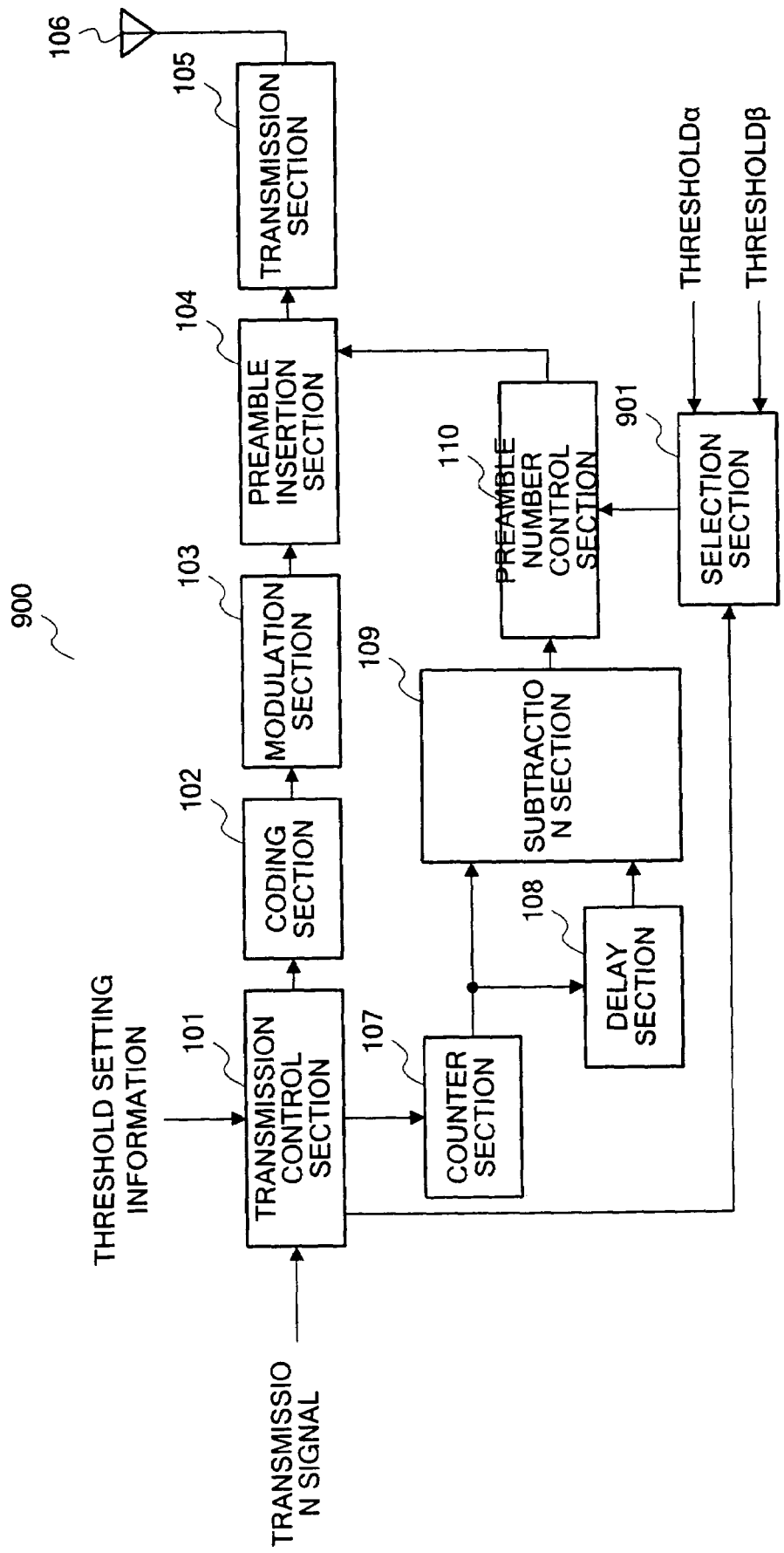
FIG. 9 is a block diagram showing a configuration of a transmission apparatus according to Embodiment 4 of the present invention.

FIG. 9 illustrates a configuration of a transmission apparatus 900 according to Embodiment 4 of the present invention. This embodiment is characterized in that threshold α or threshold β is selected based on threshold setting information such as channel quality information input from a transmission control section to a selection section. In this embodiment, FIG. 9 differs from FIG. 1 in the configuration in which a selection section 901 is provided. The same components as those in FIG. 1 are assigned the same reference numerals and explanations thereof will be omitted. Furthermore, the reception apparatus has the same configuration as that in FIG. 2, and therefore explanations thereof will be omitted.

A transmission control section 101 temporarily stores threshold setting information for selecting threshold α or threshold β input from a reception section (not shown) or threshold setting information notified from the party on the other end and outputs the threshold setting information to the selection section 901 at a timing at which transmission timing information is output. Generally, in the case of an FDD (Frequency Division Duplex) scheme, the transmission control section 101 is notified of threshold setting information from a mobile station and stores the notified threshold setting information. On the other hand, in the case of a TDD (Time Division Duplex) scheme, the transmission control section 101 stores threshold setting information detected at the time of reception. The type of threshold setting information will be described later.

The selection section 901 selects either threshold α or threshold β based on the threshold setting information input from the transmission control section 101 and outputs the selected threshold to the preamble number control section 110.

Next, the type of threshold setting information output from the transmission control section 101 to the selection section 901 will be explained.

First threshold setting information is channel quality. That is, the selection section 901 selects threshold β when channel quality information indicating poor channel quality is input from the transmission control section 101 and selects threshold α when channel quality information indicating good channel quality is input from the transmission control section 101. By so doing, if channel quality deteriorates, the number of AGC preambles is increased even if the transmission time interval of a transmission signal is relatively short, and therefore it is possible to prevent degradation of an error rate characteristic even if the channel quality deteriorates.

Second threshold setting information is a multipath delay time. That is, the selection section 901 selects threshold β when information indicating that the multipath delay time is large is input from the transmission control section 101 and selects threshold α when information indicating that the multipath delay time is small is input from the transmission control section 101. By so doing, if the multipath delay time is large, the number of AGC preambles is increased even if the transmission time interval of a transmission signal is relatively short, and therefore it is possible to prevent degradation of the error rate characteristic even if the delay time is large.

Third threshold setting information is the moving speed of a terminal. That is, the selection section 901 selects threshold β when terminal information with a high moving speed is input from the transmission control section 101 and selects threshold α when terminal information with a low moving speed is input from the transmission control section 101. By so doing, if the moving speed of the terminal increases, the number of AGC preambles is increased even if the transmission time interval of a transmission signal is relatively short, and therefore it is possible to prevent degradation of the error rate characteristic even if the moving speed of the terminal increases.

Fourth threshold setting information is a band usage situation. That is, the selection section 901 selects threshold β when band information indicating that there is a sufficient space in the band is input from the transmission control section 101 and selects threshold α when band information indicating that there is not a sufficient space in the band is input from the transmission control section 101. Whether there is a sufficient space in the band or not may also be determined based on whether the ratio of the band used for communication with the party on the other end to a maximum allowable band is equal to or greater than a threshold or may be determined using other methods. When there is a sufficient space in the band in use, the number of AGC preambles is increased, and therefore it is possible to further improve the error rate characteristic without sacrificing the transmission efficiency. The operation of the transmission apparatus 900 is the same as that in FIG. 3 except that the threshold is variable, and therefore explanations thereof will be omitted.

Thus, according to the transmission apparatus and auto gain control method of this embodiment, in addition to the effects of Embodiment 1, the number of AGC preambles is changed in consideration of not only the transmission time interval but also various types of threshold setting information, and therefore it is possible to set the number of AGC preambles in a more meticulous manner according to the channel situation, etc., with the party on the other end and further make the transmission efficiency compatible with error rate characteristic.

(Embodiment 5)

Figure 10:
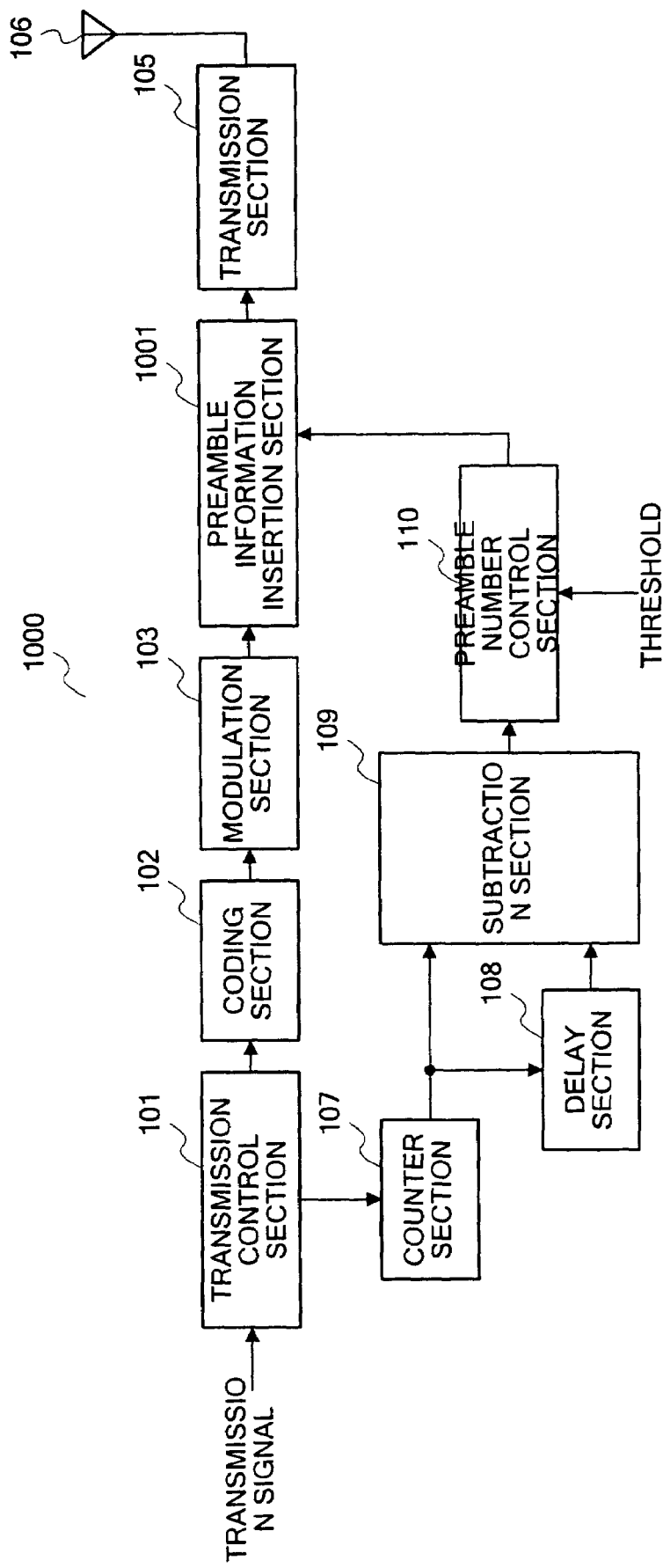
FIG. 10 is a block diagram showing a configuration of a base station apparatus to which a transmission apparatus according to Embodiment 5 of the present invention is applied.
Figure 11:
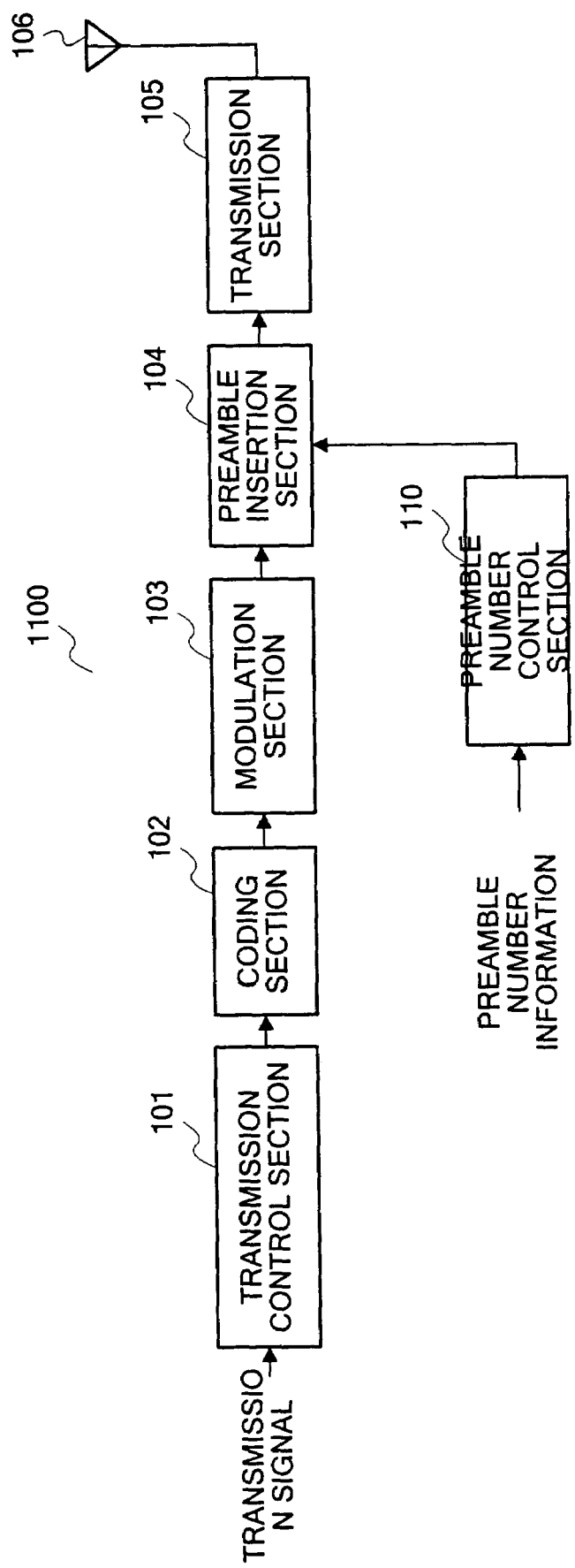
FIG. 11 is a block diagram showing a configuration of a mobile station apparatus to which the transmission apparatus according to Embodiment 5 of the present invention is applied.

FIG. 10 illustrates a configuration of a base station apparatus 1000 to which a transmission apparatus according to Embodiment 5 of the present invention is applied and FIG. 1 illustrates a configuration of a mobile station 1100 which is a communication terminal apparatus according to Embodiment 5 of the present invention. This embodiment is characterized in that the number of AGC preambles at a mobile station set by a base station apparatus is notified from the base station apparatus to the mobile station. In this embodiment, the configuration in FIG. 10 provided with a preamble information insertion section 1001 differs from that in FIG. 1. The same components as those in FIG. 1 are assigned the same reference numerals and explanations thereof will be omitted. Furthermore, the reception apparatus has the same configuration as that in FIG. 2, and therefore explanations thereof will be omitted.

The base station apparatus 1000 controls a plurality of mobile stations 1100 in a concentrated manner and controls which mobile station carries out transmission. Therefore, the base station apparatus 1000 can recognize transmission intervals of the respective mobile stations 1100.

A preamble number control section 110 compares a threshold with a transmission timing difference input from a subtraction section 109, adaptively decides the number of AGC preambles according to the result of the comparison with the threshold and outputs the number of AGC preambles decided as preamble number information at the respective mobile stations 1100 to the preamble information insertion section 1001.

The preamble information insertion section 1001 which is a notification section inserts the preamble number information input from the preamble number control section 110 into the transmission signal input from the modulation section 103 and outputs the transmission signal to the transmission section 105.

The preamble number control section 110 at the mobile station 1100 sets the number of AGC preambles set by the base station apparatus 1000 according to the preamble number information extracted from the received signal as is and instructs a preamble insertion section 104 to insert the set number of AGC preambles into the transmission signal.

Thus, according to the transmission apparatus and gain control method of this embodiment, a variable number of AGC preambles notified from the base station apparatus are inserted into the transmission signal, and therefore it is possible to prevent degradation of an AGC pull-in characteristic and make the transmission efficiency compatible with the error rate characteristic. Furthermore, the mobile station inserts AGC preambles corresponding to the number of AGC preambles notified from the base station apparatus into the transmission signal as they are and need not calculate the number of AGC preambles, and can thereby increase the processing speed.

In this embodiment, the number of AGC preambles set by the base station apparatus 1000 can be set by arbitrarily selecting any one of the methods described in Embodiments 1 to 4.

(Other Embodiments)

Figure 12:
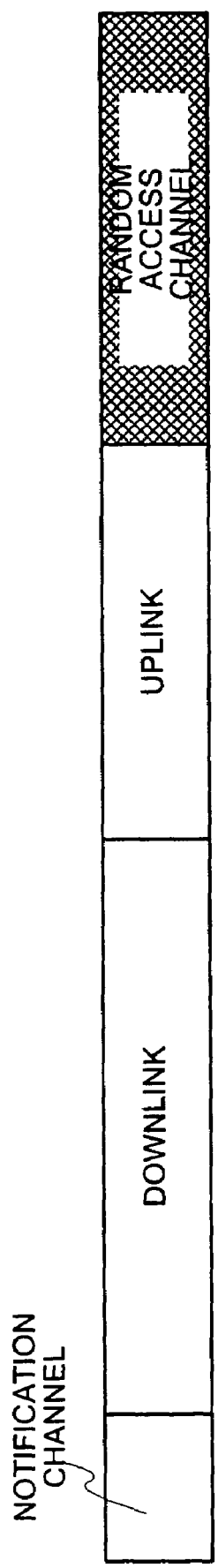
FIG. 12 illustrates a frame format.

The method of controlling the number of AGC preambles in a case where a transmission signal has a frame format including a random access channel will be explained using FIG. 12.

A channel through which a terminal, etc., carries out transmission randomly is generally called a "random access channel." A frame format including a random access channel is used, for example, for MMAC or BRAN. The number of AGC preambles in such a random access channel is increased to 10 and fixed to that number.

As another example where the number of AGC preambles is increased and fixed to that number, when data for which good channel quality is required such as retransmission data or control data is transmitted, the number of AGC preambles is increased to 10 and fixed to that number.

Furthermore, the transmission apparatuses described in Embodiments 1 to 5 can be used for both an uplink and downlink. When the number of AGC preambles is changed on the downlink, there may be users who carry out initial synchronization pulling-in, and therefore the initial synchronization pull-in characteristic may deteriorate for such users. For this reason, it is also effective to apply a change in the number of AGC preambles only to transmission apparatuses which transmit on the uplink. When the transmission apparatus described in each of the above described embodiments is applied only to a transmission apparatus which carries out transmission on the uplink, users who carry out initial synchronization pulling-in on the downlink can prevent the error rate characteristic from deteriorating.

Furthermore, in Embodiments 1 to 5, the transmission apparatus can change the number of AGC preambles from one party on the other end to another.

Furthermore, Embodiments 1 to 5 have assumed that the number of AGC preambles in the case with many AGC preambles is 10 and the ordinary number of AGC preambles is 5, but the present invention is not limited to the case where the number of AGC preambles in the case with many AGC preambles is 10 and the ordinary number of AGC preambles is 5 and can be adapted so that the number of AGC preambles in the case with many AGC preambles is set to any number other than 10 and the ordinary number of AGC preambles is set to any number other than 5. In short, any number is acceptable if the number of AGC preambles in the case with many AGC preambles is at least greater than the ordinary number of AGC preambles.

Furthermore, the transmission apparatus described in each of the foregoing embodiments can be applied to a base station apparatus and a communication terminal apparatus.

Furthermore, a transmission signal transmitted by the transmission apparatuses according to Embodiments 1 to 5 or other embodiments can be of a preamble format in an OFDM communication scheme or BRAN (Broadband Radio Access Networks) system, or without being limited to the OFDM communication scheme or BRAN system, the transmission signal can be of a preamble format according to a communication scheme other than an OFDM communication scheme or BRAN system.

Furthermore, in Embodiments 1 to 5 or other embodiments, the number of AGC preambles is set by comparing the transmission time interval or reception level, etc., with a threshold, but the present invention is not limited to the case of setting the number of AGC preambles by comparing the transmission time interval or reception level, etc., with a threshold and can use any method such as a method of determining the number of AGC preambles through calculations.

As described above, the present invention can make the transmission efficiency compatible with the error rate characteristic.

This application is based on the Japanese Patent Application No. 2002-325225 filed on Nov. 8, 2002, entire content of which is expressly incorporated by reference herein.

INDUSTRIAL APPLICABILITY

The present invention is preferably applicable to a transmission apparatus and auto gain control method for transmitting a transmission signal including auto gain control preambles.

What is claimed is:

1. A transmission apparatus comprising:
   a preamble insertion section that inserts a plurality of auto gain control preambles sequentially into a head of a transmission signal; and
   a preamble number control section that adaptively controls the number of auto gain control preambles inserted by said preamble insertion section according to a transmission time interval of said transmission signal.

2. The transmission apparatus according to claim 1, wherein said preamble number control section increases the number of auto gain control preambles at the time of first transmission by the party on the other end.

3. The transmission apparatus according to claim 1, wherein said preamble number control section increases said number of auto gain control preambles in the case of a plurality of transmissions immediately after transmission is carried out with said number of auto gain control preambles increased.

4. The transmission apparatus according to claim 1, wherein when the reception level is close to an initial value during auto gain control, said preamble number control section reduces said number of auto gain control preambles compared to the case where the reception level is far from said initial value.

5. The transmission apparatus according to claim 1, wherein said preamble number control section decides whether the party on the other end is moving away or moving closer, based on the received signal, reduces the number of auto gain control preambles when said party on the other end is moving away and increases the number of auto gain control preambles when said party on the other end is moving closer.

6. The transmission apparatus according to claim 1, wherein said preamble number control section sets a variable threshold and increases, when said transmission time interval is equal to or greater than said threshold, said number of auto gain control preambles compared to the case where said transmission time interval is smaller than said threshold.

7. The transmission apparatus according to claim 1, wherein said transmission signal is transmitted only on an uplink.

8. The transmission apparatus according to claim 1, wherein when said transmission signal includes data for which high channel quality is required, said preamble number control section is fixed to a state with a high number of auto gain control preambles.

9. The transmission apparatus according to claim 1, wherein said preamble number control section changes said number of auto gain control preambles according to channel quality.

10. The transmission apparatus according to claim 1, wherein said preamble number control section changes said number of auto gain control preambles according to a delay time of said transmission signal.

11. The transmission apparatus according to claim 1, wherein said preamble number control section changes said number of auto gain control preambles according to the moving speed of the party on the other end.

12. The transmission apparatus according to claim 1, wherein said preamble number control section changes said number of auto gain control preambles according to the bandwidth used.

13. The transmission apparatus according to claim 1, wherein said preamble number control section changes said number of auto gain control preambles using reception level information obtained in the past.

14. The transmission apparatus according to claim 1, wherein said preamble number control section changes said number of auto gain control preambles using reception level information obtained by extrapolation.

15. The transmission apparatus according to claim 1, wherein said preamble number control section fixes said number of auto gain control preambles inserted into said transmission signal to be transmitted to the party on the other end having poor channel quality to a state with a high number of auto gain control preambles.

16. The transmission apparatus according to claim 1, wherein said preamble number control section fixes said number of auto gain control preambles inserted into said transmission signal to be transmitted to the party on the other end in an environment with a large multipath delay time to a state with a high number of auto gain control preambles.

17. The transmission apparatus according to claim 1, wherein said preamble number control section fixes said number of auto gain control preambles inserted into said transmission signal to be transmitted to the party on the other end moving at a high speed to a state with a high number of auto gain control preambles.

18. The transmission apparatus according to claim 1, wherein when there is a sufficient space in the bandwidth used, said preamble number control section fixes said number of auto gain control preambles inserted into said transmission signal to a state with a high number of auto gain control preambles.

19. The transmission apparatus according to claim 1, wherein when the frame format of said transmission signal includes a random access channel, said preamble number control section fixes said number of auto gain control preambles to a state with a high number of auto gain control preambles.

20. A base station apparatus comprising a transmission apparatus, said transmission apparatus comprising:
   a preamble insertion section that inserts a plurality of auto gain control preambles sequentially into a head of a transmission signal; and
   a preamble number control section that adaptively controls the number of auto gain control preambles inserted by said preamble insertion section according to a transmission time interval of said transmission signal.

21. A communication terminal apparatus comprising a transmission apparatus, said transmission apparatus comprising:
   a preamble insertion section that inserts a plurality of auto gain control preambles sequentially into a head of a transmission signal; and
   a preamble number control section that adaptively controls the number of auto gain control preambles inserted by said preamble insertion section according to a transmission time interval of said transmission signal.

22. A communication system comprising:
a base station apparatus provided with a preamble number control section that controls the number of auto gain control preambles to be inserted into a transmission signal at a communication terminal apparatus according to a transmission time interval of said transmission signal and a notification section that notifies said number of auto gain control preambles to said communication terminal apparatus; and
a communication terminal apparatus provided with an insertion section that inserts auto gain control preambles corresponding to said number of auto gain control preambles notified by said notification section sequentially into a head of the transmission signal.

23. An auto gain control method comprising:
a step of measuring a transmission time interval of a transmission signal;
a step of adaptively determining the number of auto gain control preambles according to said transmission time interval;
a step of inserting auto gain control preambles of the determined number of auto gain control preambles sequentially into a head of the transmission signal;
a step of transmitting said transmission signal including the auto gain control preambles to the party on the other end; and
a step of said party on the other end carrying out auto gain control based on said auto gain control preambles.

* * * * *